United States Patent [19]

Tugukuni et al.

[11] 3,970,725

[45] July 20, 1976

[54] POWDERY COATING COMPOSITION AND PROCESS FOR PREPARING THE SAME

[75] Inventors: Hideyoshi Tugukuni, Sakai; Masafumi Kano, Nagaokakyo, both of Japan

[73] Assignee: Dai Nippon Toryo Co., Ltd., Osaka, Japan

[22] Filed: Sept. 25, 1973

[21] Appl. No.: 400,621

[30] Foreign Application Priority Data
Sept. 26, 1972 Japan.............................. 47-96541
Oct. 28, 1972 Japan............................ 47-108306

[52] U.S. Cl................................... 260/901; 260/13; 260/14; 260/16; 260/17 R; 260/25; 260/27 R; 260/836; 260/844; 260/862; 260/873; 260/874; 260/898
[51] Int. Cl.[2]....................................... C08L 33/08
[58] Field of Search....... 260/29.6 NR, 13, 29.6 RB, 260/34.2 R, 901, 874; 117/100 C

[56] References Cited
UNITED STATES PATENTS

| | | | |
|---|---|---|---|
| 2,945,828 | 7/1960 | Henning............................. | 260/2.5 |
| 3,102,050 | 8/1963 | Canterino et al................... | 117/100 |
| 3,494,784 | 2/1970 | De Coene et al.................... | 117/100 |
| 3,513,227 | 5/1970 | De Coene........................... | 260/887 |
| 3,745,136 | 7/1973 | Muhn et al. ................ | 260/29.6 RB |
| 3,745,196 | 7/1973 | Lane et al............................ | 260/881 |

*Primary Examiner*—Donald E. Czaja
*Assistant Examiner*—E. A. Nielsen
*Attorney, Agent, or Firm*—Haseltine, Lake & Waters

[57] ABSTRACT

This invention relates to a powdery coating composition having excellent anti-caking ability, which comprises polymer particles having an average particle size of 0.5 to 200$\mu$ composed of a polymer having a softening point not exceeding 90°C. as a core component and a polymer having a softening point of at least 100°C. as an outer component covering said core component, and to a process for the preparation of such powdery coating composition.

7 Claims, No Drawings

POWDERY COATING COMPOSITION AND PROCESS FOR PREPARING THE SAME

DESCRIPTION OF THE PRIOR ART

Powdery resinous compositions and colored powdery resinous compositions have heretofore been prepared by methods comprising pulverizing resins or pigment-dispersed resins, or by methods comprising spray drying resin solutions or latices to thereby remove solvents or water.

For instance, the following methods have been known as methods for preparing powdery resinous compositions.

1. A method comprising agitating a water-soluble, thermoplastic polymer under heating in water containing a specific dispersing agent or wetting agent to thereby disperse the polymer in water, and removing water from the resulting dispersion of fine particles (see U.S. Pat. No. 3,101,329, U.S. Pat. No. 3,449,291 and U.S. Pat. No. 3,622,555).
2. A method comprising melt-blending polyesters having different glass transition temperatures, and pulverizing the resulting blend (see U.S. Pat. No. 3,382,295).
3. A method comprising forming a powdery product composed of an acrylic polymer as a core component and an outer covering component of another acrylic polymer having a higher glass transition temperature than that of the core component polymer, and mixing the powdery product with a blocked isocyanate compound to obtain a thermoplastic molding powder. (see U.S. Pat. No. 3,659,003).
4. A method comprising adding a specific water-immiscible solvent to an aqueous dispersion of a polymer, and removing the solvent and water simultaneously by distillation to obtain a powdery product (Japanese Patent Application Laid-Open Specification No. 45550/73).
5. A method comprising polymerizing acrylic monomers in the presence of a stabilizer in a solvent capable of dissolving monomers but incapable of dissolving polymers formed from said monomer (Japanese Patent Application Laid-Open Specification No. 17888/73).

Powdery compositions obtained according to these conventional methods are defective in that they are not suitable as coating compositions or they are very poor in storage stability, especially resistance to caking.

When improvement of the caking resistance is desired, resins having a softening point of at least 90°C., preferably at least 130°C., are generally employed. In the case of a powdery coating composition including a resin having a softening point of 130°C. or higher, in order to obtain a smooth coating surface, it is necessary to conduct the baking at a high temperature exceeding 150°C. to thereby make the resin uniformly flowable. Especially in the case of a thermosetting resin, if such flow temperature approximates the curing temperature of the resin, there is inevitably brought about a disadvantage that the resin is cured while flowing and hence, a smooth coating film cannot be obtained. For this reason, a great difference between the flow temperature and the curing temperature is indispensable. In general, it is necessary that the curing temperature should be higher by at least 70°C. than the softening point (flow temperature).

As pointed out above, in conventional powdery coating compositions, for example, thermoplastic resin compositions, in order to improve the anti-caking ability, limitations are imposed on the softening point of the resin. Further, in the case of thermosetting resin compositions, in order to obtain an improved anti-caking property, limitations are imposed on such factors as the flow temperature, the melt viscosity and the curing temperature. Accordingly, powdery coating compositions available according to the conventional methods are limited to very specific ones.

SUMMARY OF THE INVENTION

This invention relates to a powdery coating composition having excellent anti-caking ability, which comprises polymer particles composed of a polymer having a softening point not exceeding 90°C. as a core component and a polymer having a softening point of at least 100°C. as an outer component covering said core component, and to a process for the preparation of such powdery coating composition.

DETAILED DESCRIPTION OF THE INVENTION

This invention has been completed as a result of our research work made with a view to developing a powdery coating composition free of the above-mentioned defects and disadvantages involved in conventional powdery coating compositions, and the objects of this invention are as follows.

1. To provide a powdery coating composition having an improved anti-caking ability (by the term "anti-caking ability" is meant a resistance to an undesired phenomenon called caking, namely a phenomenon that when a slight pressure is applied to a powdery composition in storage or transportation, the resin particles adhere to one another to form agglomerates).
2. To provide a powdery coating composition which exhibits improved melting point and flow characteristics at the baking step.
3. To provide a powdery coating composition which can give a film having excellent surface smoothness and flexibility even by low temperature baking.
4. To provide a thermosetting powdery resin composition having improved flow characteristics at the film-forming step.

In short, the main object of this invention is to provide a powdery coating composition which is excellent in storage stability and anti-caking ability though it has a low softening point and a low melt viscosity.

The "softening point" referred to in the instant specification and claims is one determined by the ring-ball method specified in Japanese Industrial Standard, JIS-K-2531.

As the process for preparing the powdery coating composition of this invention, there can be mentioned, for example, the following two processes.

I. A process comprising polymerizing in water a monomer giving a polymer having a softening point not exceeding 90°C. to obtain an aqueous dispersion of a polymer having a softening point not exceeding 90°C., adding a monomer giving a polymer having a softening point of at least 100°C. to the aqueous dispersion, polymerizing said monomer to obtain an aqueous dispersion of fine particles composed of a core component and an outer covering component, separating the fine polymer particles from the aqueous phase and drying them.

II. A process comprising conducting the steps of (i) dispersing or suspending a polymer (A) having a softening point not exceeding 90°C. as a core component in a solvent selected from water and organic solvents, and (ii) dissolving a polymer (B) having a softening point of at least 100°C. as an outer covering component in said solvent, said solvent being incapable of dissolving said polymer (A) but capable of dissolving said polymer (B), said steps (i) and (ii) being conducted in an optional order or simultaneously, and then spray drying the resulting composition.

Since fine particles of this invention obtained according to the foregoing processes have their surface coated with a resin having a softening point of at least 100°C., their surface characteristics are not substantially different from those of conventional anti-caking powder particles. Further, since the fine particles of this invention contain in the interior thereof a resin having a lower softening point, the melting temperature and flow characteristics of the particles at the baking step are highly improved. Therefore, films having excellent surface smoothness can be prepared from the fine particles of this invention, even if the baking is conducted at a low temperature.

According to the above process (I), a powdery composition of this invention is prepared by employing monomers as starting materials, and according to the above process (II), a powdery composition of this invention is prepared by employing polymers as starting materials.

As the monomer giving a softening point not exceeding 90°C., which is used in the process (I), there can be used one monomer or a mixture of two monomers or more. In this invention, it is desired that at least a part, preferably 5 to 60% by weight, of the starting monomer component giving a polymer having a softening point not exceeding 90°C. is a monomer, a homopolymer of which has a glass transition temperature (hereinafter abbreviated to "$Tg$") lower than 0°C.

As the monomer giving a homopolymer having a $Tg$ lower than 0°C., there can be mentioned, for example, ethyl acrylate, butyl acrylate, 2-ethylhexyl acrylate, 2-ethylhexyl methacrylate, lauryl methacrylate, n-decyl methacrylate, tetradecyl methacrylate, vinyl propionate, dibutyl itaconate, dibutyl fumarate and the like.

As the monomer giving a homopolymer having a $Tg$ higher than 0°C., there can be mentioned, for example α-methylstyrene, styrene, vinyltoluene, methyl acrylate, n-tetradecyl acrylate, methyl methacrylate, ethyl methacrylate, n-propyl methacrylate, butyl methacrylate, isobutyl methacrylate, tert-butyl methacrylate, cyclohexyl methacrylate, acrylonitrile, vinyl acetate, dimethyl itaconate, acrylic acid, methacrylic acid, itaconic acid, crotonic acid, maleic anhydride, acrylamide, N-methylol acrylamide, N-n-butoxymethyl acrylamide, diacetone acrylamide, trimethylamine methacrylimide, 1,1-dimethyl-1-(2-hydroxypropyl)-amine methacrylimide, 1,1-dimethyl-1-(2,3-hydroxypropyl)-amine methacrylimide, β-hydroxyethyl methacrylate, β-hydroxypropyl methacrylate, glycidyl methacrylate, dimethylaminoethyl methacrylate, tetrahydrofuryl methacrylate and the like. These monomers are used singly or in the form of a mixture of two or more of them.

In this invention, the polymer having a softening point of at least 100°C. is prepared from a monomer exemplified above, and a suitable combination of two or more of such monomers can also be used. In the latter case, it is desired that at least 60% by weight of the starting monomer mixture is constituted by a monomer, a homopolymer of which has a $Tg$ higher than 0°C., especially a $Tg$ higher than 50°C.

Glass transition points of homopolymers of typical monomers to be used in the process (I) are illustrated in Tables 1 and 2 given below.

Table 1

Monomers Giving Homopolymers Having a $Tg$ Lower than 0°C.

| Monomer | $Tg$ (°C.) of Homopolymer |
|---|---|
| ethyl acrylate | −22 |
| isopropyl acrylate | − 5 |
| n-butyl acrylate | −54 |
| 2-ethylhexyl acrylate | −85 |
| cyclohexyl acrylate | −15 |
| n-hexyl methacrylate | − 5 |
| n-octyl methacrylate | −20 |
| n-decyl methacrylate | −70 |
| lauryl methacrylate | −65 |
| tetradecyl methacrylate | − 9 |
| 2-ethylhexyl methacrylate | −20 |
| vinyl propionate | − 2 |

Table 2

Monomers Giving Homopolymers Having a $Tg$ Higher than 0°C.

| Monomer | $Tg$ (°C.) of Homopolymer |
|---|---|
| methyl acrylate | 8 |
| tert-butyl acrylate | 41 |
| n-tetradecyl acrylate | 20 |
| methyl methacrylate | 105 |
| ethyl methacrylate | 65 |
| n-propyl methacrylate | 33 |
| isopropyl methacrylate | 81 |
| n-butyl methacrylate | 20 |
| iso-butyl methacrylate | 48 |
| tert-butyl methacrylate | 107 |
| sec-butyl methacrylate | 60 |
| phenyl methacrylate | 110 |
| cyclohexyl methacrylate | 66 |
| 2-hydroxyethyl methacrylate | 55 |
| hydroxypropyl methacrylate | 26 |
| acrylic acid | 106 |
| methacrylic acid | 185 |
| vinyl acetate | 29 |
| acrylonitrile | 96 |
| styrene | 100 |

Glass transition temperatures $Tg$ and softening points of examples of polymers having a softening point not exceeding 90°C. and polymers having a softening point of at least 100°C., which are prepared from the foregoing monomers, are shown in Tables 3 and 4 given below.

Table 3

Polymers Having a Softening Point Not Exceeding 90°C.

| Monomer Giving Homopolymer Having Tg Lower than 0°C. (% by weight) (Monomer P) | | | Monomer Giving Homopolymer Having Tg Higher Than 0°C. (% by weight)(Monomer Q) | | | Copolymer PQ | |
|---|---|---|---|---|---|---|---|
| 2-ethylhexyl acrylate ($Tg$=−85°C.) | ethyl acrylate ($Tg$=−20°C.) | n-hexyl methacrylate ($Tg$=−5°C.) | methyl acrylate ($Tg$=8°C.) | ethyl methacrylate ($Tg$=65°C.) | styrene ($Tg$=100°C.) | $Tg$ (°C.) | Softening Point (°C.) |
| | | | 100 | | | 8 | 10–50 |
| 10 | | | | 90 | | 40 | 50–90 |

Table 3-continued

| Monomer Giving Homopolymer Having Tg Lower than 0°C. (% by weight) (Monomer P) | | | Monomer Giving Homopolymer Having Tg Higher Than 0°C. (% by weight)(Monomer Q) | | | Copolymer PQ | |
|---|---|---|---|---|---|---|---|
| 2-ethylhexyl acrylate (Tg=−85°C.) | ethyl acrylate (Tg=−20°C.) | n-hexyl methacrylate (Tg=−5°C.) | methyl acrylate (Tg=8°C.) | ethyl methacrylate (Tg=65°C.) | styrene (Tg=100°C.) | Tg (°C.) | Softening Point (°C.) |
| 20 | | | | | 80 | 40 | 50–90 |
| 20 | | | | 40 | 40 | 30 | 30–80 |
| 20 | | | | 80 | | 17 | 20–70 |
| 20 | | | 20 | | 60 | 25 | 30–80 |
| | 20 | | 40 | | 40 | 30 | 35–85 |
| | 10 | | 70 | | 20 | 20 | 30–80 |
| | 40 | | | | 60 | 38 | 40–90 |
| | 40 | | | 20 | 40 | 33 | 35–90 |
| | 40 | | 20 | 20 | 20 | 20 | 35–80 |
| | 50 | | | | 50 | 30 | 35–80 |
| | | 10 | 70 | | 20 | 30 | 35–80 |
| | | 10 | 40 | 20 | 30 | 40 | 30–90 |
| | | 10 | 40 | 40 | 10 | 35 | 40–80 |

Table 4

| Monomer Giving Homopolymer of Low Tg (% by weight) (Monomer S) | | Monomer Giving Homopolymer of High Tg (% by weight) (Monomer T) | | | Copolymer ST | |
|---|---|---|---|---|---|---|
| ethyl acrylate (Tg=−20°C.) | n-butyl methacrylate (Tg=20°C.) | styrene (Tg=100°C.) | 2-hydroxyethyl methacrylate (Tg=55°C.) | methacrylic acid (Tg=185°C.) | Tg (°C.) | Softening Point (°C.) |
| 10 | | 90 | | | 87 | 100 – 120 |
| 5 | | 75 | 10 | 10 | 112 | 130 – 150 |
| 5 | | 80 | 10 | | 85 | 100 – 120 |
| 5 | 10 | 80 | | 5 | 83 | 100 – 115 |
| 20 | | 80 | | | 68 | higher than 100 |
| | 20 | 70 | 10 | | 64 | higher than 105 |
| | | 70 | 25 | 5 | 81 | 105 – 125 |
| | | 90 | | 10 | 112 | 120 – 150 |
| | 10 | 80 | 10 | | 80 | 100 – 120 |
| | 10 | 75 | 10 | 5 | 87 | 103 – 125 |
| | | 100 | | | 100 | 120 – 140 |

In view of the flow characteristics of the powdery resin composition at the baking step, it is generally preferred that such homopolymers or copolymers have a number average molecular weight of about 1,500 to about 30,000.

In the process (I) of this invention, by employing a suitable combination of a monomer giving a polymer of high Tg and a monomer giving a polymer of low Tg, it is possible to obtain a stable powdery composition comprising a core composed of a low-softening-point polymer having a softening point not exceeding 90°C. and an outer cover composed of a high-softening-point polymer having a softening point of at least 100°C. More specifically, one or more monomers selected so as to give a polymer having a softening point not exceeding 90°C. are dispersed in water to form an aqueous dispersion and suspension polymerization or emulsion polymerization is carried out in the presence of a polymerization initiator to obtain an aqueous polymer dispersion. In general, the polymerization is conducted at a temperature ranging from room temperature to about 120°C. for 30 minutes to 8 hours. Then, one or more monomers selected so as to give a polymer having a softening point of at least 100°C. are added together with a polymerization initiator to the above polymer dispersion, and the polymerization is carried out under conditions similar to those mentioned above.

Selection of monomers for obtaining a polymer having a softening point not exceeding 90°C. or a polymer having a softening point of at least 100°C. can be performed by prescribing the Tg which is one of the factors controlling the softening point and determining the amounts and kinds of monomers by conducting the calculation based on such prescribed Tg and Tg's of homopolymers of the monomers.

Further, tables such as Tables 3 and 4 are prepared in advance, and based on the data of such tables, the kinds and amounts of monomers which will give a polymer having a desired softening point are selected.

In the process (I), in order for the outer polymer to cover sufficiently the core polymer, it is desired that both the polymers be electrostatically attracted to each other, for instance, by making a cationic active agent present in one of the two polymers and making an anionic active agent present in the other polymer.

Dispersing conditions such as the agitation rate are preferably so selected that the average size of the final polymer particles is within the range of 0.01 to 1000μ, especially 0.5 to 200μ.

In the above-mentioned two kinds of polymerization, as the polymerization initiator, there can be used, for instance, inorganic peroxides such as ammonium persulfate, potassium persulfate, hydrogen peroxide and percarbonates, organic peroxides such as acyl peroxides (e.g., benzoyl peroxide), alkyl hydroperoxides (e.g., tert-butyl hydroperoxide and p-menthane hydroperoxide) and dialkyl peroxides (e.g., di-tert-butyl peroxide), and nitrile compounds such as $\alpha,\alpha'$-azobisisobutyronitrile. Further, combinations of inorganic or organic peroxides and reducing agents can be used as redox catalysts. As the reducing agent, there can be mentioned, for instance, potassium acid sulfite, potassium sulfite, sodium acid sulfite, sodium sulfite, sodium hydrosulfite, potassium hydrosulfite, sodium formaldehyde sulfoxylate, potassium formaldehyde sulfoxylate and zinc formaldehyde sulfoxylate. The amount of the catalyst is not particularly critical in this invention, but in general, the catalyst is used in an amount of 0.01 to 5% by weight of the total monomers. If required, a known chain transfer agent can be used in order to adjust the molecular weight.

In addition, if required, known anionic, cationic or non-ionic surfactants, suspension stabilizers, emulsifiers and other additives may be employed to disperse the starting monomers or particles of the resulting polymer stably in water. Moreover, a water-soluble macromolecular substance usually employed in this field can be used as a protective colloid.

Ratios of the monomers used in the above-mentioned two-staged polymerization are so selected that in the final polymer particles, the weight ratio of the non-volatile component of the inner core polymer of a low softening point to the non-volatile component of the outer covering polymer of a high softening point is within a range of from 3/1 to 2/3, preferably from 2/1 to 1/1. When the amount of the outer covering polymer is too large, the softening point and flow characteristics of the final polymer particles are substantially dominated by those of the outer polymer. When the amount of the core polymer is too large, the intended improvement of the anti-caking ability cannot be attained because of the influence of the low softening point of the core polymer present in too large an amount. Therefore, it is preferred that the ratio of the amounts of the core polymer and outer covering polymer be adjusted within the above range.

The intended powdery coating composition can be obtained by separating fine polymer particles from the thus obtained aqueous polymer dispersion or emulsion according to a known method and drying the separated polymer particles. The above separation can be accomplished according to known techniques such as filtration. Drying of the separated polymer particles can also be accomplished by known techniques such as spray drying, freeze drying and vacuum drying. In the case of spray drying, it is desired that the inlet temperature of the drying chamber be maintained above 100°C. and that the outlet temperature be maintained below 100°C.

In the above process (I), if a pigment is incorporated in the polymer particles, there can be adopted a method comprising dispersing a pigment in the monomer and then polymerizing the monomer dispersed in water, a method comprising dispersing a pigment in water, then dispersing the monomer into the aqueous dispersion of the pigment and then polymerizing the monomer, and other similar methods. In general, customary organic and inorganic pigments are used. They may be employed singly or in the form of admixtures of two or more of them. If necessary, a pigment-dispersing agent is employed in combination with the pigment.

In the fine particles obtained according to the above-mentioned method (I), both the outer polymer and core polymer are bonded to each other merely physically, or they are partially reacted with each other. Either of these two bonding states can be optionally attained by controlling the reaction conditions such as the temperature, time and catalyst amount appropriately. In each of these bonding states, the intended objects of this invention can be fully attained.

The process (II) will now be described.

The step (i) of dispersing or suspending a polymer (A) in water or an organic solvent incapable of dissolving the polymer (A) therein can be accomplished by the following methods.

a. A method comprising dispersing the powdery polymer (A) in water or an organic solvent (hereinafter referred to merely as "solvent"). For instance, there can be mentioned a method in which the powdery polymer (A) is mechanically agitated in the solvent to thereby disperse it in the solvent, or a method in which the powdery polymer (A) is dispersed or suspended in the solvent with the aid of a dispersing agent. (As means for obtaining the starting powder of the polymer (A), there can be adopted known methods such as mechanical pulverization methods, e.g., the air jet pulverization method and the ball mill pulverization method, and liquid resin or latex spray drying methods.)

b. A method comprising emulsifying and dispersing the polymer (A) directly in the solvent. This method is employed when the polymer (A) is liquid.

c. A method in which a commercially available latex, resin emulsion or suspension-polymerized resin is employed as it is.

d. A method comprising heating the polymer (A) in the solvent at a temperature higher than the melting point of the polymer (A), forcibly emulsifying the polymer (A) and cooling it.

e. A method comprising mixing a small amount of the polymer (A) with a solvent capable of dissolving the polymer (A), dispersing the mixture under agitation in a large amount of said solvent incapable of dissolving the polymer (A), and then removing the above polymer-dissolving solvent from the resulting dispersion.

f. A method comprising polymerizing the polymer (A)-constituting monomer in the solvent as in the above-mentioned process (I) to thereby obtain a dispersion of the polymer (A).

The step (ii) of the process (II) can be accomplished only by dissolving the polymer (B) in the solvent. In case the solubility of the polymer (B) is low, it is possible to heat the system to dissolve the polymer (B), as long as the polymer (A) is not dissolved by such heating.

Either step (i) or step (ii) can be conducted first and it also is possible to conduct them simultaneously.

Thus, according to this invention, there can be obtained a suspension of fine polymer particles composed substantially of two layers, even if the resulting dispersion is not particularly allowed to stand still for a certain period of time.

As the polymer (A) of a softening point not exceeding 90°C., there can be mentioned, for instance, alkyd resins, modified alkyd resins (alkyd resins modified with rosin, phenol, styrene, an acrylic compound or the like), phenol resins, natural resin-modified phenol resins, maleic resins, fumaric resins, natural resin-modified maleic resins, natural resin-modified pentaerythritol resins, cellulose derivatives, ester gums, rosin, petroleum resins, cumarone resins, indene resins, polyester resins, polyamide resins, epoxy resins, polycarbonate resins, styrene resins, butyral resins, vinyl resins, acrylic resins, chlorinated rubbers, ketone resins, xylene resins, melamine resins, benzoguanamine resins, urea resins, blocked isocyanate resins, polyurethane resins and the like. These resins can be used in the form of admixtures of two or more of them.

Water and various commercially available organic solvents can be used as the solvent incapable of dissolving the polymer (A) but capable of dissolving the monomer (B). For instance, ordinary organic solvents of alcohol, ether, ester and ether alcohol types are employed. Selection of a suitable solvent is performed mainly in view of the kinds of polymers (A) and (B) actually employed. In order to attain a high spray-drying efficiency, it is desired that a solvent having a boiling point not exceeding 150°C. be employed.

As the polymer (B) which is water-soluble and has a softening point of at least 100°C., there can be mentioned, for instance, polyester resins, cellulose derivatives, acrylic resins, alkyd resins and the like. It is possible to employ two or more of these resins in combination.

As the polymer (B) which is soluble in an organic solvent and has a softening point of at least 100°C., there can be mentioned cellulose derivatives, acrylic resins and other commercially available resins. They are used singly or in the form of admixtures of two or more of them.

In each of the foregoing resins to be used as the polymer (B) in this invention, the softening point is controlled to a level of at least 100°C. For instance, in the case of polyester resins, the softening point can be controlled by the combination of a polybasic acid and a polyhydric alcohol. In the case of acrylic resins (copolymer resins), the softening point can be controlled by determining the glass transition temperature of a homopolymer of a monomer to be used and selecting a suitable comonomer based on the thus determined glass transition temperature.

In the process (II) of this invention, ordinary organic or inorganic pigments, dyes, fillers and other additives may be incorporated in either or both of the polymers (A) and (B). In case the polymer (A) or (B) is a solid resin, incorporation of a pigment can be accomplished by means of a heating roll, a heating kneader, an extruder or the like. In case the polymer (A) or (B) is a liquid resin or latex, a three-roll disperser, a ball mill, a sand grinder and other ordinary dispersers can be used for incorporation of a pigment into the polymer. In case different pigments are incorporated into the polymers (A) and (B), respectively, a multi-color film can be obtained from the resulting polymer particles.

The intended polymer particles of this invention can be obtained by spray drying the liquid composition obtained by conducting the steps (i) and (ii) in an optional order or simultaneously.

The spray drying is performed by any of known conventional methods. In order to prevent agglomeration by cohesion of the resulting polymer particles and obtain a good dry condition, it is desired that the spray drying be conducted so that the air temperature at the inlet of the spray drier is higher than 100°C. and the air temperature at the outlet of the spray drier is lower than 100°C. The spray drying is conducted under such conditions that the size of the resulting polymer particles is 0.01 to 1000$\mu$, preferably 0.5 to 200$\mu$.

The weight ratio of the non-volatile components of the polymer (A) and the polymer (B) is within the range of from 40/60 to 100/0.1, preferably from 50/50 to 100/1.

It is desired that the concentration of the liquid composition obtained by dispersing the polymer (A) and dissolving the polymer (B) in the solvent be within the range of 10 to 70% by weight, especially 30 to 60% by weight.

The powdery coating composition of this invention prepared according to the above-mentioned process (I) or (II) is composed of a core polymer particle having a low softening point (not exceeding 90°C.) and an outer covering polymer having a high softening point (at least 100°C.). By dint of this specific particle structure, the powdery coating composition of this invention has very excellent anti-caking ability, though it includes as one component a polymer having a low softening point, which readily undergoes caking. Further, by dint of the presence of such low-softening-point polymer at the baking step the powdery coating composition of this invention melts at a much lower temperature than in the case of polymer particles composed solely of a high-softening-point polymer, and therefore, the powdery coating composition of this invention exhibits excellent flow characteristics at the baking step, with the result that a coating film having excellent gloss, appearance and surface smoothness and having a high flexibility can be obtained.

The powdery coating composition of this invention prepared according to the above-mentioned process (I) or (II) is coated on a substrate to be coated, such as metal substrates, e.g., iron, aluminum, zinc or zinc-plated iron plates, plywoods, wooden boards, slate plates, plastics and the like according to customary coating methods, such as a fluidized bed coating method, a sprinkling method, an electrostatic powder coating method, an electrostatic fluidized bed coating method, a spraying method and the like. Then, the coated composition is heat treated at 100° to 300°C. for 5 to 60 minutes. Thus is obtained a coating film having such excellent properties as mentioned above. In view of the flow characteristics at the film-forming step and the surface smoothness of the resulting film, it is desired that at the film-forming step (baking step) the powdery coating composition be heated and molten at a temperature higher by at least 10°C. than the softening point of the outer covering polymer.

This invention will now be illustrated more concretely by reference to Examples, in which all "parts" and "%" are on the weight basis unless otherwise indicated.

EXAMPLE 1

A reaction vessel equipped with a stirrer, a thermometer and a nitrogen gas generator was charged with 1,000 parts of water and 30 parts of Nikkol DDP-10 (phosphoric acid type surfactant manufactured by Nippon Surfactant Industry Co., Ltd.), and the mixture was agitated to form an aqueous dispersion. In a nitrogen atmosphere, the temperature of the dispersion was elevated to 75°–80°C. Then, a mixture of monomers having the following formulation (1) was suspended in the aqueous dispersion.

| Formulation (1): | |
|---|---|
| 2-ethylhexyl methacrylate | 260 parts |
| methyl methacrylate | 170 parts |
| styrene | 200 parts |
| 2-hydroxyethyl methacrylate | 50 parts |
| methacrylic acid | 20 parts |
| dodecyl mercaptan | 1 part |
| benzoyl peroxide | 10 parts |

The mixture was reacted for 1 hour at the above temperature, and a mixture of monomers of the following formulation (2) was added dropwise to the reaction mixture over a period of 1 hour.

| Formulation (2): | |
|---|---|
| 2-ethylhexyl methacrylate | 20 parts |
| N-methylol acrylamide | 40 parts |
| styrene | 100 parts |
| methyl methacrylate | 100 parts |
| butyl methacrylate | 35 parts |
| methacrylic acid | 5 parts |
| Emcol-CC-36 (cationic surfactant manufactured by Witco Chemical Co., Ltd.) | 0.5 part |

After completion of the dropwise addition, the temperature was elevated to 80°–85°C. and at this temperature polymerization was continued for 2 hours to obtain a suspension of resin particles composed of a core polymer of a low softening point having a $Tg$ of 35°C. (calculated value: each of the $Tg$ values given hereinafter is a calculated value) and a softening point of 75°C. and a high-softening-point polymer covering said core polymer, said outer covering polymer having a $Tg$ of 75°C. and a softening point of 120°C. The thus obtained suspension was dried in a spray drier in which the inlet temperature was 200°C. and the outlet temperature was 100°C. Thus was obtained a powdery resin having an average particle size of $20\mu$. The number average molecular weight of one resin particle was about 2,500.

When the resulting powdery resin was stored at 40°C. for 1 week to examine the stability, it was found that no caking occurred and the powder exhibited good stability. When this powder was coated on an iron plate and baked at 140°C. for 30 minutes, a smooth and transparent film was obtained.

EXAMPLE 2

A reaction vessel equipped with a stirrer, a thermometer and a nitrogen gas generator was charged with 500 parts of water, and 20 parts of Pelox OTP (anionic surfactant manufactured by Kao Soap Co., Ltd.), 10 parts of ammonium persulfate and 10 parts of potassium sulfite were dissolved in water. Under agitation a mixture of monomers of the following formulation (1) was added to the solution.

| Formulation (1): | |
|---|---|
| ethyl acrylate | 60 parts |
| lauryl methacrylate | 50 parts |
| β-hydroxyethyl methacrylate | 30 parts |
| styrene | 20 parts |
| butyl methacrylate | 40 parts |
| titanium dioxide (white pigment) | 100 parts |
| dodecyl mercaptan | 2 parts |

The inside atmosphere of the reaction vessel was replaced by nitrogen gas, and the above mixture was reacted at 80°C. for 1 hour. Then, 5 parts of ammonium persulfate and 5 parts of potassium sulfite were added to the reaction mixture, and a mixture of monomers of the following formulation (2) was added dropwise to the reaction mixture over a period of 1 hour.

| Formulation (2): | |
|---|---|
| methyl methacrylate | 100 parts |
| styrene | 70 parts |
| trimethylamine methaacrylamide | 30 parts |

After completion of the dropwise addition, the reaction was further conducted for 2 hours to form an aqueous suspension of a thermosetting resin composition composed of a white pigment-containing core polymer of a low softening point having a $Tg$ of $-5$°C. and a softening point of 50°C. and an outer polymer of a high softening point covering said low-softening-point polymer. The suspension was dried in a spray drier in which the inlet temperature was 180°C. and the outlet temperature was 90°C. to obtain a white powdery thermosetting resin composition having an average particle size of $30\mu$. The number average molecular weight of one polymer particle was about 4,000.

When this powder was stored at 40°C. for one week to examine the stability, it was found that no change occurred. When the powder was coated on an iron plate and baked at 160°C. for 30 minutes, a smooth, thermoset film having solvent resistance was obtained.

EXAMPLE 3

A reaction vessel equipped with a stirrer, a thermometer and a nitrogen gas generator was charged with 500 parts of water, and 20 parts of Emul NC (anionic surfactant manufactured by Kao Soap Co., Ltd.) and 30 parts of Emulgen 903 (HLB 8; non-ionic surfactant manufactured by Kao Soap Co., Ltd.) were dissolved in water. The temperature was elevated to 80°C., and under agitation a pigment-dispersed mixture of monomers having the following formulation (1) was suspended in the solution.

| Formulation (1): | |
|---|---|
| lauryl methacrylate | 20 parts |
| n-butyl methacrylate | 150 parts |
| styrene | 30 parts |
| Phthalocyanine Blue (blue pigment) | 50 parts |
| precipitated barium sulfate (extender pigment) | 150 parts |
| azobisisobutyronitrile | 5 parts |

The reaction was carried out for 2 to 3 hours, and after completion of the reaction, a liquid mixture of the following formulation (2) was added dropwise to the reaction mixture over a period of 2 hours.

| Formulation (2): | |
|---|---|
| methyl methacrylate | 100 parts |
| styrene | 100 parts |
| butyl acrylate | 100 parts |
| azobisisobutyronitrile | 2 parts |
| Emcol CC-36 (same as used in Example 1) | 0.5 part |

After completion of the dropwise addition, the temperature was elevated to 85°C. and polymerization was continued for 6 hours at this temperature, to obtain a suspension of resin particles composed of a low-softening-point core polymer having a $Tg$ of 10°C. and a softening point of 60°C. and a high-softening-point polymer covering said low-softening-point core polymer, said outer covering polymer having a $Tg$ of 60°C. and a softening point of 100°C. This suspension was filtered and the separated solid was vacuum dried to obtain a fine powder of an average particle size of 50μ having flowability. Either the core polymer or the outer covering polymer had a number average molecular weight of about 6,000.

The thus obtained powdery composition had excellent storage stability. When this powdery composition was coated on a substrate and baked at 140°C. for 30 minutes, a smooth blue film having a good gloss was obtained.

EXAMPLE 4

One hundred parts of titanium dioxide was dispersed uniformly in a liquid mixture of 150 parts of methyl methacrylate and 150 parts of lauryl methacrylate, and 3 parts of benzoyl peroxide was added to the resulting dispersion. The mixture was added to an aqueous solution of 15 parts of Pelex OTP (anionic surfactant manufactured by Kao Soap Co., Ltd.) and 15 parts of polyvinyl alcohol dissolved in 400 parts of water. The resulting suspension was charged in a reaction vessel equipped with a stirrer, a thermometer and a nitrogen gas generator, and the temperature was elevated to 75°C. At this temperature, the reaction was carried out for 2 to 3 hours.

Separately, a mixture of 100 parts of methyl methacrylate, 100 parts of styrene, 1 part of Emcol CC-36 (same surfactant as used in Example 1), 2 parts of benzoyl peroxide and 1 part of dodecyl mercaptan was emulsified in an aqueous solution of 10 parts of polyvinyl alcohol in 200 parts of water. The resulting emulsion was added to the above reaction mixture in the reaction vessel over a period of 30 minutes. After completion of the dropwise addition, the reaction was carried out at 85°C. for 40 minutes to obtain a suspension of resin particles composed of a white pigment-containing core polymer having a Tg of 10°C. and a softening point of 30°C. and an outer covering polymer having a softening point of 120°C. and a Tg of 100°C., said outer polymer covering said core polymer. The resin particles were separated by a centrifugal separator and freeze dried to obtain white, flowable resin particles having an average particle size of 20μ. When the thus obtained powdery composition was subjected to the stability test for 1 week at 35°C., no change was observed. When this composition was coated on an iron plate and baked at 140°C. for 30 minutes, a white film having excellent smoothness, gloss and flexibility was obtained.

COMPARATIVE EXAMPLES 1 to 3

1. A powdery composition was prepared by mixing all the components of the formulation (1) and (2) used in Example 1 at one time polymerizing the resulting mixture under the same conditions as described above, and conducting the spray drying.

2. A powdery composition was prepared by polymerizing the formulation (1) used in Example 1 and spray drying the resulting polymer composition.

3. A powdery composition was prepared by polymerizing the formulation (2) used in Example 1 and spray drying the resulting polymer composition.

With respect to each of the thus obtained powdery compositions, the spray drying property, i.e., the caking or cohesion tendency of the powder at the spray drying step, the storage stability, i.e., the anti-caking ability in storage, and the film-forming property, i.e., the smoothness of the resulting film, were tested to obtain results shown in Table 5.

Table 5

| Powdery Composition | Spray Drying Property[1] | Storage Stability[2] | Film-Forming Property[3] |
|---|---|---|---|
| Example 1 | O | O | O |
| Comparative Example 1 | Δ | X | O |
| Comparative Example 2 | X | X | O |
| Comparative Example 3 | O | O | X |

O: good, Δ: slightly bad, X: bad

Notes:
[1] inlet temperature of 200°C. and outlet temperature of 100°C.
[2] stored at 40°C. for one week
[3] baked at 140°C. for 30 minutes

EXAMPLE 5

Fifty parts of titanium dioxide was uniformly dispersed in a mixture composed of the following components:

| acrylic acid | 5 parts |
| ethyl acrylate | 20 parts |
| methyl acrylate | 40 parts |
| 2-hydroxyethyl methacrylate | 15 parts |
| styrene | 20 parts |
| dodecyl mercaptan | 1 part |
| benzoyl peroxide | 5 parts |

The resulting dispersion was suspendeed in 300 parts of water maintained at 90°C., in which 15 parts of sodium dodecylbenzene sulfonate and 100 parts of calcium phosphate were dissolved and dispersed. Under agitation, 50 parts of methyl methacrylate and Emcol-CC-36 0.01 part were added to the suspension over a period of 30 minutes, and the reaction was further conducted for 3 hours to obtain a suspension of resin particles composed of a core polymer having a softening point of 40°C. and a Tg of 150°C. and an outer polymer having a softening point of 120°C. and a Tg of 100°C., said outer polymer covering the core polymer.

Hydrochloric acid was added to the thus formed suspension, and it was washed sufficiently with water and dried to obtain a flowable powdery composition composed of spherical particles having an average particle size of 50μ. When this composition was subjected to the storage stability test at 35°C. for 1 week, no change was observed. When this composition was coated on an iron plate and baked at 180°C. for 30 minutes, a smooth surface having excellent gloss and flexibility was obtained.

EXAMPLE 6

Five parts of dicyandiamide and 80 parts of titanium dioxide were dispersed in 100 parts of a molten epoxy resin (Epikote 1001 manufactured by Shell International Chemical Corp.) by means of an extruder, and the resulting composition was pulverized by means of an air jet pulverizer, to obtain a white epoxy resin powder having a size of 10 to 20μ.

Five parts of Ethocel 20-STD (ethyl cellulose of a softening point of 135° to 145°C. manufactured by Dow Chemicals Corp.) was dissolved in 100 parts of ethanol having a boiling point of 78°C. 100 parts of the above white epoxy resin powder was dispersed into this solution. The resulting dispersion was dried in a spray drier in which the inlet temperature was 200°C. and the outlet temperature was 75°C. Thus was obtained a white flowable powder having an average particle size of 20μ.

The white epoxy resin powder before the ethyl cellulose treatment and the ethyl cellulose-treated white epoxy resin powder were stored at 50°C. for one week to examine the storage stability. In the former powder blocking occurred, but in the latter composition of this invention no change was observed. When both the powdery compositions were coated on an iron plate and heated at 150°C., in each case a good flowability was observed and a smooth film as obtained.

EXAMPLE 7

Eighty parts of Desmophen 650 (polyester resin for urethane having a softening point of 60°C., manufactured by Bayer AG), 20 parts of Desmodure-AP Stable (blocked isocyanate manufactured by Bayer AG) and 2 parts of dibutyl tin dilaurate (dissociation catalyst) were uniformly kneaded by means of an extruder maintained at 70°C. and the kneaded mixture was pulverized by means of an air jet pulverizer to obtain a resin powder having an average particle size of 20μ.

A styrene-maleic acid copolymer having an acid value of 110 to 115 and a melting point of 135° to 145°C. was neutralized with ammonia and a 2% aqueous solution of the neutralized copolymer was prepared. 80 Parts of the above resin powder was dispersed in 100 parts of the thus prepared aqueous solution, and the dispersion was dried in a spray drier in which the inlet temperature was 200°C. and the outlet temperature was 100°C. Thus was obtained a flowable resin powder having an average particle size of 20μ. The resin powder before the treatment with the styrene-maleic acid copolymer and the resin powder treated with said copolymer were subjected to the storage stability test at 50°C. for one week. In the former resin powder, caking was observed, but in the latter resin powder no change was observed, When both the resin powders were coated on an iron plate and heated at 150°C., in each case a smooth film was obtained, and there was observed no difference between the two resin powders with respect to the film-forming property.

EXAMPLE 8

Five parts of Phthalocyanine Blue was dispersed in 100 parts of a dispersion of an acrylic copolymer having a softening point of 70°C. and a particle size of 10μ, which was prepared by suspension polymerization of the following components according to a known method:

| | |
|---|---|
| water | 100 parts |
| styrene | 30 parts |
| methyl methacrylate | 20 parts |
| 2-ethylhexyl acrylate | 27 parts |
| butyl acrylate | 13 parts |
| glycidyl methacrylate | 10 parts |
| dodecyl mercaptan | 1 part |

According to a known method, the following components were subjected to free radical polymerization to obtain an acrylic copolymer having a softening point of 120°C. and an acid value of 65:

| | |
|---|---|
| styrene | 40 parts |
| methyl methacrylate | 27 parts |
| butyl acrylate | 25 parts |
| acrylic acid | 8 parts |
| isopropyl alcohol | 100 parts |

10 parts of the thus formed acrylic copolymer was neutralized with triethylamine and a 10% aqueous solution of the neutralized copolymer was prepared. 50 Parts of the solution was mixed with the above dispersion and the resulting liquid mixture was spray dried in a spray drier in which the inlet temperature was 200°C. and the outlet temperature was 90°C. to obtain a blue, flowable resin powder composed of a core polymer having a softening point of 70°C. and an outer covering polymer having a softening point of 120°C. When this resin powder was heated at 50°C. for 1 week, occurrence of such undesired phenomena as caking was not observed. When this resin powder was coated on an iron plate and baked at 180°C. for 20 minutes, a smooth film was obtained.

EXAMPLE 9

A copolymer having a softening point of 50°C. was prepared from the following components according to a known bulk polymerization method:

| | |
|---|---|
| styrene | 40 parts |
| methyl methacrylate | 20 parts |
| 2-ethylhexyl acrylate | 30 parts |
| butyl acrylate | 10 parts |

100 parts of the thus prepared copolymer, 30 parts of cellulose acetate butyrate (½ second) and 100 parts of titanium dioxide were melt kneaded by means of a heating roll, and the kneaded mixture was pulverized by an air jet pulverizer so that the average particle size of the pulverized product was 20μ. 100 Parts of the resulting white powder was dispersed in 100 parts of a 5% solution of ethyl cellulose in ethanol, and the dispersion was spray dried to obtain a white, flowable powder, the surface of which was covered with ethyl cellulose. When the powder not treated with ethyl cellulose was heated at 50°C. for one week, occurrence of caking was observed, but in the case of the powder treated with ethyl cellulose no change was observed. When both the powders were coated on a substrate and heated at 150°C. for 30 minutes, in each case a white film having excellent smoothness and gloss was obtained.

EXAMPLE 10

One hundred parts of Pentacite P-406 (natural resin-modified pentaerythritol resin having a softening point of 80 to 90°C, manufactured by Dainippon Ink & Chemical, Inc.) was melted in water maintained at a temperature higher than 95°C., and agitation was conducted so that the dispersed particles had a size of 20 to 30μ. When cooling was conducted, there was obtained a suspension of fine particles. 1 Part of Cellosize WP (hydroxyethyl cellulose of a softening point of 140°C. manufactured by Union Carbide Corporation) was dissolved in the suspension, and it was spray dried to obtain a powder, the surface of which was coated with hydroxyethyl cellulose. No caking occurred in this powder during storage, and when this powder was heated at 140°C. for 30 minutes, a smooth film was obtained.

EXAMPLE 11

One hundred parts of titanium dioxide was dispersed in 100 parts of an emulsion of an acrylic copolymer having a softening point of 65°C. which was obtained by emulsion polymerization the following components:

| | |
|---|---|
| lauryl methacrylate | 30 parts |
| styrene | 20 parts |
| ethyl acrylate | 30 parts |
| 2-hydroxyethyl methacrylate | 20 parts |
| dodecyl mercaptan | 2 parts |
| water | 100 parts |

Then, 2 parts of the same hydroxyethyl cellulose as used in Example 10 was dissolved in the above dispersion, and it was spray dried to obtain a white, flowable powder having an average particle size of 40μ. In this powder no caking was observed during storage, and this powder gave a good film when heated.

EXAMPLE 12

Twenty parts of Hitanol 2180 (phenol resin having a softening point of 65° to 80°C. manufactured by Hitachi Chemical Co., Ltd.) was dissolved in 100 parts of a 50% xylene solution of the same epoxy resin as used in Example 6, and 60 parts of titanium dioxide was kneaded and dispersed in the above solution according to a known method. The resulting dispersion was emulsified in a dispersion medium composed of 100 parts of water, 10 parts of acetone and 8 parts of Epogen S-5 (non-ionic surfactant manufactured by Dai-Ichi General Co., Ltd.), and the organic solvent component was removed by heating under reduced pressure with stirring. There was obtained a white epoxy-phenol resin suspension. To this suspension was added 50 parts of a 10% aqueous solution of the same water-soluble acrylic copolymer used in Example 8. The suspension was spray dried to obtain a white, flowable powder composed of a white core component of the epoxy-phenol resin having a softening point of 70°C. and an outer covering component of the acrylic resin having a softening point of 120°C. When this powder was heated at 50°C. for 1 week, occurrence of such undesired phenomena as caking was not observed. When this powder was coated on a substrate and baked at 180°C. for 20 minutes, a white film having excellent gloss and smoothness was obtained.

EXAMPLE 13

Two parts of carbon black was kneaded and dispersed in 50 parts of Super Bekamin 820 (60% solution of a melamine resin having a softening point of 10°C. in a 1:1 mixed solvent of xylol and butanol; manufactured by Dai Nippon Ink & Chemical, Inc.), and the mixture was emulsified and dispersed in water. When the solvent (xylol and butanol) was removed by heating in vacuo, an aqueous dispersion of a black powder of the melamine resin was obtained.

Separately, a mixture of 450 parts of coconut oil, 100 parts of trimethylol propane, 201 parts of pentaerythritol, 525 parts of phthalic acid, 144 parts of trimellitic anhydride and 600 parts of ethyl cellosolve was condensed according to a conventional method to obtain an alkyd resin solution having an acid value of 60 and a non-volatile content of 70% (the softening point of the resin is 120°C.). 3 parts of carbon black was kneaded and dispersed in 100 parts of the thus obtained resin solution, and the mixture was neutralized to a pH of 8 with use of ammonia.

The thus neutralized resin solution was dissolved in the above aqueous dispersion, and the resulting liquid mixture was spray dried to obtain a black, flowable powder. No caking occurred when it was stored, and a smooth film having solvent resistance was obtained by coating it on a substrate and heating it at 150°C. for 30 minutes.

EXAMPLE 14

A mixture composed of 30 parts of styrene, 20 parts of methyl methacrylate, 5 parts of 2-hydroxyethyl methacrylate 15 parts of glycidyl methacrylate, 20 parts of ethyl acrylate, 10 parts of butyl acrylate and 1 part of dodecyl mercaptan was suspension polymerized according to a known method, and the resulting reaction mixture was dried to obtain a powder of an acrylic copolymer having a softening point of 65°C. and a particle size of 500μ.

A mixture composed of 60 parts of the above acrylic copolymer, 15 parts of sebacic acid, 25 parts of titanium dioxide and 1 part of a flow regulator was melted and kneaded by means of an extruder, and the kneaded mixture was pulverized by means of a turbo-mill to obtain a white fine powder having an average particle size of 50μ.

100 parts of the thus obtained powder was dispersed in 150 parts of a 1% solution of ethyl cellulose in ethanol, and the dispersion was spray dried to obtain a white powdery composition having flowability, the surface of which was covered with ethyl cellulose. This composition had excellent storage stability. When this composition was coated on an iron plate and baked at 180°C. for 20 minutes, a smooth film having excellent finish characteristics was obtained.

What is claimed is:

1. A powdery coating composition comprising polymer particles having an average particle size within the range of 0.5 to 200μ and composed of, as a core component, an acrylic copolymer having a softening point not exceeding 90°C. and containing 5 to 60% by weight of units of a monomer whose homopolymer has a Tg lower than 0°C. and, as an outer component, an acrylic polymer having a softening point of at least 100°C. and containing at least 60% by weight of units of a monomer whose homopolymer has a Tg higher than 50°C., wherein the weight ratio of the core component to the outer component is within a range from 50/50 to 100/1, and said outer component covers said core component.

2. The composition of claim 1 wherein the core component comprises a copolymer of 2-ethylhexyl methacrylate, methyl methacrylate, styrene, 2-hydroxyethyl methacrylate and methacrylic acid and the outer component comprises a copolymer of 2-ethylhexyl methacrylate, N-methylol acrylamide, styrene, methyl methacrylate, butyl methacrylate and methacrylic acid.

3. The composition of claim 1 wherein the core component comprises a copolymer of ethyl acrylate, lauryl methacrylate, β-hydroxyethyl methacrylate, styrene and butyl methacrylate and the outer component comprises a copolymer of methyl methacrylate, styrene and trimethylamine methacrylamide.

4. The composition of claim 1 wherein the core component comprises a copolymer of lauryl methacrylate, n-butyl methacrylate and styrene and the outer component comprises a copolymer of methyl methacrylate, styrene and butyl acrylate.

5. The composition of claim 1 wherein the core component comprises a copolymer of methyl methacrylate and lauryl methacrylate and the outer component comprises a copolymer of methyl methacrylate and styrene.

6. The composition of claim 1 wherein the core component comprises a copolymer of acrylic acid, ethyl acrylate, methyl acrylate, 2-hydroxyethyl methacrylate and styrene and the outer component comprises poly(methyl methacrylate).

7. The composition of claim 1 wherein the core component comprises a copolymer of styrene, methyl methacrylate, 2-ethylhexyl acrylate, butyl acrylate and glycidyl methacrylate and the outer component comprises a copolymer of styrene, methyl methacrylate, butyl acrylate and acrylic acid.

* * * * *